(No Model.)
G. N. SAEGMULLER.
EQUATORIAL MOUNTING FOR TELESCOPES.
No. 395,002. Patented Dec. 25, 1888.
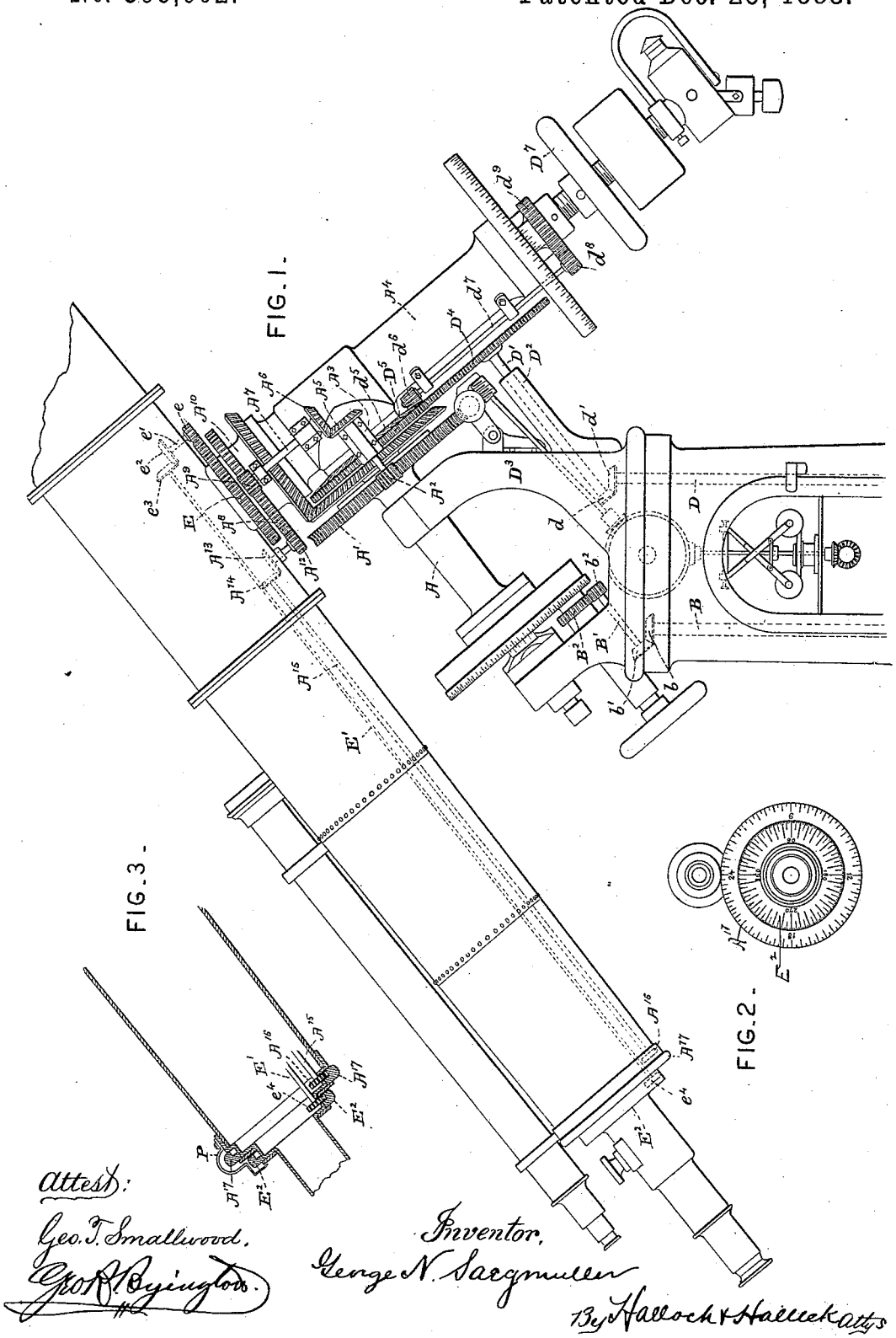

UNITED STATES PATENT OFFICE.

GEORGE N. SAEGMULLER, OF WASHINGTON, DISTRICT OF COLUMBIA.

EQUATORIAL MOUNTING FOR TELESCOPES.

SPECIFICATION forming part of Letters Patent No. 395,002, dated December 25, 1888.

Application filed May 16, 1888. Serial No. 274,085. (No model.)

*To all whom it may concern:*

Be it known that I, GEORGE N. SAEGMULLER, a citizen of the United States, residing at Washington, in the District of Columbia, have invented certain new and useful Improvements in Equatorial Mountings; and I do hereby declare the following to be a full, clear, and exact description of the invention, such as will enable others skilled in the art to which it appertains to make and use the same.

My invention relates to improvements in the mechanism for moving the large telescopic or equatorial instruments upon their polar and declination axes and setting the same. In this class of devices the observer labors under a number of difficulties in operating the telescope and reading the declination and hour circles. The physical exertion necessary to change the position of the telescope to meet the variant conditions of observation renders the observer more or less unfit to make those delicate observations which are necessary for the highest kind of work. The circles are also at such a distance from the observer's station that great difficulty is experienced in reading them.

One of the objects of this invention is to obviate the necessity of the observer using any manual labor in changing the position of the instrument. To accomplish this object mechanism operated by any suitable motor within the control of the observer is connected by suitable gearing with mechanism arranged upon the instrument in such manner that by starting the motor the observer can direct the telescope in any desired position. The form of motor is immaterial, as I propose to use the kind that is best adapted for my purpose in view of the circumstances or surroundings of the place where the instrument is set up. For example, if electricity be the most convenient I would use it as the motive power, and I would place the motor in any desired place. The preferred place for an electric motor would be upon the instrument itself, and the armature-shaft of the same might be secured to or form a part of one of the shafts of the turning mechanism of the instrument.

Another object of my invention is to reproduce within the vision of the observer the markings of the hour-circle upon the polar axis; and my object is accomplished by connecting the polar axis with an hour-circle arranged upon the eye end of the telescope.

Another object of my invention is to reproduce within the vision of the observer the markings upon the declination-circle, and this is accomplished by mechanism that will hereinafter be described.

The invention consists of constructions and combinations, all as will hereinafter be described in the specification and pointed out in the claims, reference being had to the accompanying drawings, in which—

Figure 1 represents a side elevation having my improvements attached thereto; Fig. 2, an end view of the telescope, showing the arrangement of the circles thereon; and Fig. 3, a detail in section and showing a pointer to indicate the motion in right ascension and declination.

H represents the telescope mounted in the usual manner upon the pedestal and provided with the usual clock-work mechanism, H', for regulating the movement of the solar-axis circle and with my improved construction.

A is the polar axis, having an hour-circle and the gear-wheel A' connected with the mechanism operated by the clock-work, (not shown,) and into which a small pinion, $A^2$, gears. The shaft of this pinion is supported by an arm, $A^3$, attached to a socket, $A^4$, for the declination-axis, and is provided with a miter or bevel wheel, $A^5$, gearing with a miter or bevel wheel, $A^6$, on shaft $A^7$. This shaft is also supported from socket $A^4$, and is provided with a pinion, $A^9$, gearing with wheel $A^8$, which is loose upon the declination-axis or its socket, in order not to interfere with the turning of the telescope in declination. A shaft having a pinion, $A^{12}$, at one end, to gear with wheel $A^8$, and a miter-wheel, $A^{13}$, at the other end, to gear with miter-wheel $A^{14}$, is journaled in the tube of the telescope, so that the wheel $A^{13}$ will be inside and the pinion $A^{12}$ outside of the shell. The miter-wheel $A^{14}$ is secured to shaft $A^{15}$, which extends down to the eye end of the telescope. The lower end of the shaft is provided with a pinion, $A^{16}$, which gears with the internal gear of the loose ring $A^{17}$ on the outside of the telescope. (See Fig. 3.) The front part of this ring $A^{17}$ has its face graduated to indicate hours, minutes, &c., as shown in Fig. 2, so that the observer will have reproduced within easy reach of his eye the hours, minutes, &c., shown on the hour-circle of the polar axis.

It will of course be understood that the gear-wheels used in connecting the two hour-circles are so proportioned and arranged that the movement of the hour-circle upon the polar axis will be exactly reproduced upon the second hour-circle on ring $A^{17}$, and this construction will also be given to the parts hereinafter described.

To relieve the observer of all physical exertion in moving the telescope around the polar axis, by using the turning rods and handles usually provided for this purpose, I propose to use a motor of any suitable construction placed at any suitable point within the control of the observer. The preferred form of motor is one that can be easily started and stopped and reversed at pleasure, so that the observer can regulate to a nicety the movements of the parts either backward or forward without moving from his station. To do this suitable connections between the observer's station and the motor will be made. As the means for making these connections are so various and obvious, description of them is unnecessary. The motor is connected in any suitable manner with the vertical shaft B, which is geared to shaft B' by beveled wheels $b$ and $b'$. Shaft B' is provided with a pinion, $b^2$, gearing into the axis $B^2$, which has heretofore been used to turn the polar axis by hand, and can be so used now without interfering with my device. To the same or a separate motor a second vertical shaft, D, is geared in any suitable manner. This shaft in turn is geared to shaft D' by means of bevel gear-wheels $d$ and $d'$, and has its bearings in a lug, $D^2$, attached to the standard $D^3$. Upon its upper end is a wheel, $D^4$, which gears into a wheel, $D^5$, fitting loosely on the polar axis A, in order not to interfere with the turning of the latter, nor the latter with it. This wheel $D^5$ has a beveled cogged face, $d^5$, on its inner side, and gears with pinion $d^6$ on shaft $d^7$, which has at its lower end a pinion, $d^8$, gearing into wheel $d^9$, fixed on the declination shaft or axis, thus affecting the same rotation by means of the motor that is obtained by the hand-wheel $D^7$, or by taking hold of the telescope-tube itself.

In order to show the motion in declination at the eye end of the telescope, I place a gear-wheel, E, upon the declination-socket $A^4$, and into this wheel is geared a pinion, $e$, on shaft $e'$, which projects into the telescope-tube and has a bevel-gear, $e^2$, for the bevel-wheel $e^3$ on shaft E'. This shaft is parallel with shaft $A^{15}$, and extends down to the eye end of the telescope, at which point it is provided with a pinion, $e^4$, which gears with the internal gear upon the loose ring $E^2$. The front face of this ring is graduated into degrees, thus indicating on the circle the motion of declination.

To clearly indicate to the eye the motion in right ascension and declination, a fixed pointer, P, is attached to the tube and overlaps the circles which move under it.

What I claim as new is—

1. The combination of a polar axis having a gear-wheel and a telescope having an hour-circle connected with the gear-wheel on the polar axis by suitable gearing.

2. The combination of a polar axis having an hour-circle, and a telescope having an hour-circle connected with the polar axis by suitable gearing.

3. The combination of a polar axis having an hour-circle and a gear-wheel, A', and a telescope having an hour-circle, and a line of shafting secured to the telescope and geared to the hour-circle upon the latter and connected with the gear-wheel A' by intermediate gearing.

4. The combination of a polar axis having an hour-circle and a gear-wheel, A', the telescope having an hour-circle corresponding to the hour-circle on the polar axis, and a line of shafting provided with gear-wheels, one of which gears with the gear-wheel of the hour-circle and the other with a counter-shaft, and a socket for the declination-axis, having a loose gear-wheel which connects with the gearing on the counter-shaft, and shafting having gear-wheels which connect the gear-wheel on the socket with the gear-wheel on the polar axis.

5. The combination of a telescope having a ring at the eye end provided with a circle graduated to indicate degrees, and a line of shafting geared to the ring at one end, and a declination-axis having a gear-wheel geared to the line of shafting on the telescope.

6. The combination of a telescope, the declination-axis having geared connections on its socket, and a standard having shafting connected with a suitable motor and with the geared connections on the declination-axis, substantially as described, whereby the declination-axis can be rotated independently of the hand-wheel.

7. The combination of a telescope, the polar axis having a gearing-wheel, the declination-axis having gearing connected with the gear-wheel on the polar axis, and a standard having shafting connected with a suitable motor and gearing connected with the gearing on the polar axis, substantially as described.

8. The combination of a telescope, the vertical shafts and their supports, the polar axis connected with one of said shafts, and the declination-axis connected with the other shaft by gearing supported by said standard and polar axes.

9. The combination, with the declination-axis, of a power-shaft connected by suitable gearing with said declination-axis.

10. The combination of the polar and declination axes of a telescope with power-shafting connected by suitable gearing with said axes.

In testimony whereof I affix my signature in presence of two witnesses.

GEORGE N. SAEGMULLER.

Witnesses:
GEO. R. BYINGTON,
M. F. HALLECK.